United States Patent [19]

Bales et al.

[11] Patent Number: 5,502,757
[45] Date of Patent: Mar. 26, 1996

[54] LOCATION DEPENDENT SERVICE FOR A WIRELESS TELEPHONE

[75] Inventors: Bruce M. Bales, Louisville; John C. Moran, Denver, both of Colo.

[73] Assignee: AT&T Corp., Murray Hill, N.J.

[21] Appl. No.: 173,813

[22] Filed: Dec. 22, 1993

[51] Int. Cl.⁶ .................................... H04Q 7/22
[52] U.S. Cl. ................... 379/58; 379/59; 379/60; 379/207
[58] Field of Search ................. 379/207, 58, 59, 379/60

[56] References Cited

U.S. PATENT DOCUMENTS

| | | | |
|---|---|---|---|
| 4,313,035 | 1/1982 | Jordan et al. | 178/18 E |
| 4,878,216 | 10/1989 | Yunoki | 370/60 |
| 4,896,319 | 1/1990 | Lidinsky et al. | 370/60 |
| 4,899,333 | 2/1990 | Roediger | 370/60 |
| 4,899,373 | 2/1990 | Lee et al. | 379/207 |
| 4,988,209 | 1/1991 | Davidson et al. | 370/58.2 |
| 5,001,710 | 3/1991 | Gawrys et al. | 370/110.1 |
| 5,012,512 | 4/1991 | Basso et al. | 379/218 |
| 5,014,266 | 5/1991 | Bales et al. | 370/60.1 |
| 5,016,243 | 5/1991 | Fite, Jr. | 370/16 |
| 5,023,780 | 6/1991 | Brearley | 364/200 |
| 5,023,868 | 6/1991 | Davidson et al. | 370/62 |
| 5,036,535 | 7/1991 | Gechter et al. | 379/210 |
| 5,051,992 | 9/1991 | Taniguchi et al. | 370/110.1 |
| 5,062,103 | 10/1991 | Davidson et al. | 370/58.1 |
| 5,210,787 | 5/1993 | Hayes et al. | 379/59 |
| 5,249,302 | 9/1993 | Metroka et al. | 379/59 |
| 5,353,331 | 10/1994 | Emery et al. | 379/58 |
| 5,390,241 | 2/1995 | Bales et al. | 379/207 |

Primary Examiner—Edward L. Coles, Sr.
Assistant Examiner—Thomas L. Stoll
Attorney, Agent, or Firm—John C. Moran

[57] ABSTRACT

Using a plurality of terminal service profiles (TSP) that are selected on the basis of the switching system to which a wireless mobile unit is registered. Each TSP defines the operation of features associated with the wireless mobile unit, and a service profile defines features associated with a directory number shared by a stationary station set and the wireless mobile unit. This allows some features to be associated only with the wireless mobile unit and other features to be associated with the shared directory number. These other features are usable by the wireless mobile unit and any other unit sharing the shared directory number. These other features are performed on a permanent switching system to which the shared directory number is assigned. When the wireless mobile unit is not associated with a stationary telephone station set, different TSPs are selected based on the particular switching system to which the wireless mobile unit is registered. ISDN messages are used to provide those features which should appear to be performed on a permanent switching system as if the wireless mobile unit was registered on the permanent switching system.

27 Claims, 6 Drawing Sheets

LOCATION DEPENDENT SERVICE FOR A WIRELESS TELEPHONE

TECHNICAL FIELD

This invention relates to a telecommunications switching system and, in particular, to providing wireless features in a location-dependent manner on such a telecommunications switching system.

BACKGROUND OF THE INVENTION

In general, prior art telecommunications switching system, that provided wireless service for mobile units, have not allowed for the portability of features from one switching system to another. Within the wireless prior art, it is known to be able to go from one geographical area served by one switching system to another geographical area served by another switching system and to be able to register a mobile unit in both geographical areas. In addition, the U.S. patent application entitled "Telecommunication Switching System Having Transparent Wireless Features", Ser. No. 08/371,652, a Continuation of Ser. No. 07/995,417 filed Dec. 8, 1992, now abandoned, discloses the sharing of a telephone number by a wireless mobile unit and a stationary telephone station set. In the referenced patent application, the features provided to the mobile unit are the same and appear to be performed on the switching system to which the stationary telephone station set is attached regardless to which switching system the mobile unit is registered. The referenced patent application also allows for the same type of operations without requiring a stationary telephone station set be associated with the mobile unit. In this case, the wireless mobile unit is assigned a home switching system, and all feature actuations appear to occur on this home switching system. The referenced U.S. patent application does solve the problem of allowing coordination of features between the stationary telephone station set and the wireless mobile unit.

The problems in the prior art are as follows. First, whether the wireless mobile unit is associated with a stationary telephone station set or not, the user of the wireless mobile unit may want some of the telecommunication features provided to the wireless mobile unit to always function as if the wireless mobile unit was registered on the home switching system; whereas, other telecommunication features are to function as if the mobile unit was a stationary telephone set attached to the temporary switching system. As examples, the voice mail system utilized by the user of the mobile unit may remain fixed and be associated with the permanent switching system. The user of the mobile unit would be able to access the voice mail messages as if the mobile unit was registered on the permanent switching system. However, the fax machine associated with the wireless telephone should be at the location of the switching system to which the wireless telephone set is presently registered. Another example of a feature which may remain fixed with respect to the permanent switching system is call coverage provided to the mobile unit regardless of where the unit is. Finally, greater flexibility must be allowed the users of mobile units in determining which features will appear to be provided by the permanent switching unit and which features will appear to be provided by the switching system on which the mobile unit is presently registered.

SUMMARY OF THE INVENTION

The foregoing problems are solved, and a technical advance is achieved by an apparatus and method that use a plurality of terminal service profiles (TSP) that are selected on the basis of the switching system to which a first telecommunication unit is connected. Each TSP defines the operation of features associated with the first telecommunication unit, and a service profile defines features associated with a directory number shared by a second telecommunication unit and the first telecommunication unit. This allows some features to be associated only with the first telecommunication unit and other features to be associated with the shared directory number. These other features are usable by the first and second telecommunication units.

When a directory number is shared by the first and second telecommunication units, the directory number is terminated by a first software application program that is executing on a permanent switching system. A second software application program communicates with the first software application program information regarding the operation of the first telecommunication unit with respect to the shared directory number. All features associated only with the first telecommunication unit are controlled by the second software application program as defined by a TSP. The second software application program communicates the results of those features to the first software application program. When the first telecommunication unit connects to another switching system, a new TSP is provided to the second software application program by a network manager in response to the first telecommunication unit connecting to the other switching system. The second software application program is executed on the switching system on which the first telecommunication unit is connected. The second software application program is responsive to the new TSP to control the provision of telecommunication features to the first telecommunication unit.

Advantageously, when the first telecommunication unit is not associated with a second telecommunication unit, different TSPs are selected based on the particular switching system to which the first telecommunication unit is connected. The second software application program is responsive to the TSP to utilize ISDN messages to provide those features which should appear to be performed on a permanent switching system as if the first telecommunication unit was connected to the permanent switching system.

Advantageously, the first telecommunication unit is a wireless mobile unit and the second telecommunication unit is a wired telephone station set.

Other and further aspects of the present invention will become apparent during the course of the following description and by reference to the accompanying drawing.

DETAILED DESCRIPTION

Figure 1:
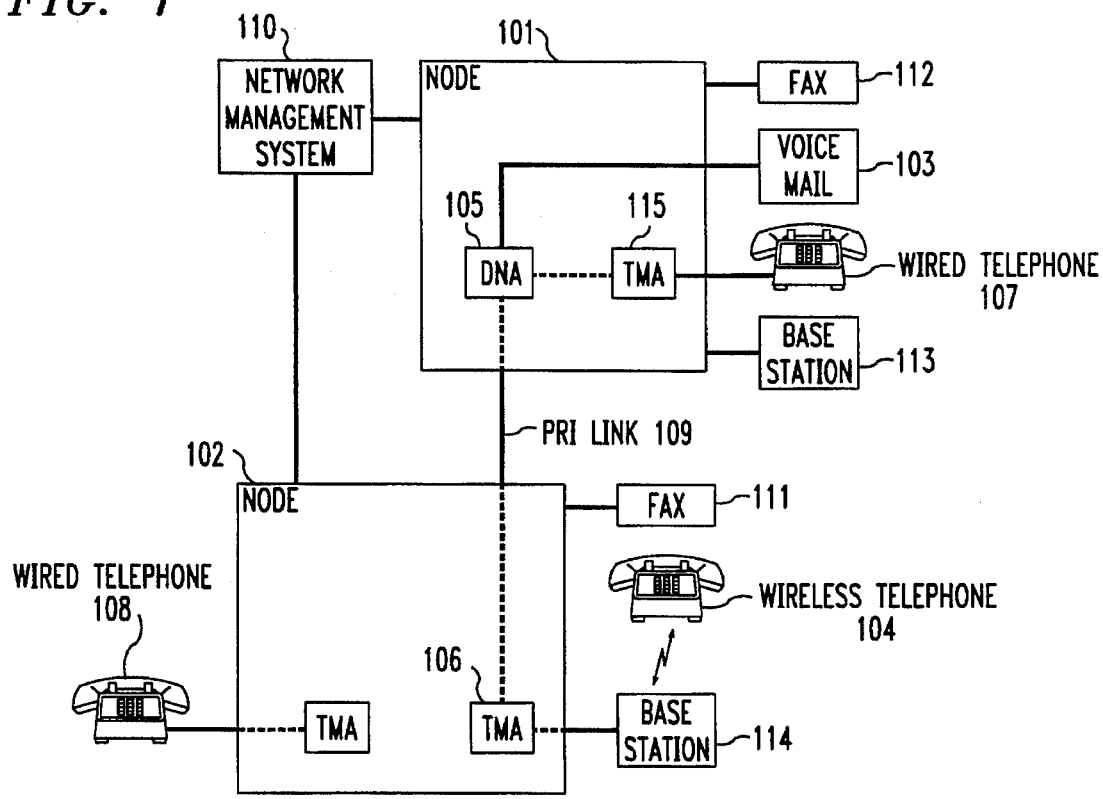
FIG. 1 illustrates, in block diagram form, a telecommunication switching system embodying the inventive concept.

FIG. 1 illustrates a first embodiment of the invention where wireless telephone 104 has a shared line appearance with wired telephone 107. The telecommunication switching system illustrated in FIG. 1 has a primary and secondary routing plan. The primary routing plan utilizes the directory number which is the number dialed by a user to place a telephone call through the telecommunication switching system. An example of a telecommunication switching system having a primary and secondary dialing plan is set forth in the previously referenced U.S. patent application, Ser. No. 07/995,417, which is hereby incorporated by reference.

In accordance with the invention, some of the features executed by wireless telephone 104 operate in the same manner as if wired telephone 107 was executing those features; and the remainder of the features function as if wireless telephone 104 was a wired telephone, such as wired telephone 108, permanently connected to node 102. The dialed number assigned to the shared line appearance is controlled by dialed number application (DNA) 105 which is executing in node 101. Upon the initialization of node 101, DNA 105 is executed and requests from management system 110 the service profile associated with the shared directory number assigned to the shared line appearance. The service profile defines how both incoming and outgoing calls associated with the shared directory number are to be processed. The service profile also specifies that there will be a wired telephone and a wireless telephone associated with the shared directory number. These telephones are identified by their service profile ID (SPID) information. One skilled in the art could readily envision that wireless telephone 104 could be a wired telephone which was being moved from switching node to switching node. Also, wireless telephone 104 could be one of a plurality of well known telecommunication units.

Again, upon initialization of node 101, wired telephone 107 begins the initialization process, and terminal management application (TMA) 115 starts to execute. Using the SPID, TMA 115 requests from management system 110 the terminal service profile (TSP) associated the TSP information. The TSP information defines that wired telephone 107 shares the shared directory number with a wireless telephone. Further, the TSP information identifies DNA 105 as the application controlling the shared directory dialed number. TMA 115 then identifies itself to DNA 105. The message transmitted to DNA 105 identifies the secondary routing address of wired telephone 107.

Similarly, when wireless telephone 104 registers itself on node 102 via base station 114, TMA 106 starts to execute. TMA 106 requests the SPID information from wireless telephone 104 and utilizes the SPID information to request the TSP information for wireless telephone 104 from management system 110. Management system 110 stores a different set of TSP information for each node, determines from which node the request for the TSP information was received, and selects the correct set of TSP information for transmission to the requesting node.

From the TSP information received from management system 110, TMA 106 determines that shared directory number is controlled by DNA 105 and transmits a message to DNA 105 identifying that wireless telephone 104 is registered on node 102. TMA 106 transmits the message to DNA 105 using the shared directory number. The message transmitted to DNA 105 identifies the secondary routing address of wireless telephone 104.

To further understand how the system illustrated in FIG. 1 provides location dependent services/features, consider the following three examples of features. These features are the accessing of voice mail system 103, the reception of facsimile messages via fax machine 111 or 112, and the placement of calls using the local numbering plan of the node on which wireless telephone 104 is presently registered. First, consider the operation with respect to voice mail system 103. When a call is directed to the shared directory number which is shared by wireless telephone 104 and wired telephone 107, that call is first directed to DNA 105, and that call is transferred to voice mail 103, after wireless telephone 104 and wired telephone 107 fail to accept the call. DNA 105 supplies to voice mail system 103 the shared directory number. As is well known in the art, voice mail system 103 answers the call and stores an audio message.

After responding to the call intended for the shared directory number, voice mail system 103 transmits to DNA 105 a message defining that there is an audio message waiting on voice mail system 103 for this directory number. (The message is directed to the shared directory number.) DNA 105 is responsive to this message to transmit to the terminal management applications controlling wired telephone 107 and wireless telephone 104 (utilizing the secondary dialing plan) messages indicating that a message is waiting. The terminal management applications respond to this message by actuating a visual indicator on each terminal.

The user can obtain the audio message from mail system 103 by using either wireless telephone 104 or wired telephone 107. Both telecommunication terminals have an auto dial button which when actuated causes the controlling terminal management application to place a call to voice mail system 103. As is well known in the art, voice mail system 103 provides additional features to telecommunication terminals which have a number (normally referred to as the extension number) in the local dialing plan of node 101. These features allow an individual accessing voice mail 103 to enter less information in order to access and use features on voice mail system 103.

The user can obtain the message from voice mail system 103 by using either wireless telephone 104 or wired telephone 107. The actuation of the auto dial button on either telephone set causes the associated TMA to transmit the extension number on node 101 for voice mail system 103 to DNA 105. DNA 105 is responsive to the message to set up a connection between wireless telephone 104 or wired telephone 107 with voice mail system 103. Indeed, any call that is dialed by either wireless telephone 104 or wired telephone 107 is first directed to DNA 105; and then, the call is placed by DNA 105 so that the receiving station set receives the shared directory telephone number as the caller ID. If the user utilized wireless telephone 104, while it was registered on node 102, to obtain the audio message, voice mail system 103 treats this call as having originated from a telephone connected to node 101, since the call to voice mail system 103 is originated by DNA 105 with respect to the primary dialing plan. DNA 105 also transmits messages to wired telephone 107 indicating that the line associated with the shared directory telephone number is in use. (This operation exists regardless of the location of the wireless telephone.)

Consider now the example of a fax call being directed to the shared directory number. In this example, the fax call will always be directed to a fax machine connected to the node on which wireless telephone 104 is registered. When a fax call is received by DNA 105 for the shared directory number, DNA 105 examines the bearer capability of the call and determines that it is a fax call. DNA 105 examines the service profile that was received from management system 110 during initialization and ascertains that all fax calls are to be directed to wireless telephone 104. DNA 105 then sets up a call to TMA 106 utilizing the secondary numbering plan and merges that call with the fax call.

TMA 106 is responsive to the fax call to examine the TSP information received from management system 110 during initialization. TMA 106 determines that fax 111 is to receive all fax calls directed to wireless telephone 104. In response to this determination, TMA 106 sets up a call to fax machine 111 and merges that call with the call from DNA 105. If wireless telephone 104 was to register on node 101, subsequent fax calls would be directed to fax 112 in a similar manner. This capability, allows the user of wireless telephone 104 to receive fax messages at a fax machine that is convenient to the user. The use of the merge messages allows DNA 105 to receive signaling information concerning the fax call on an ongoing basis.

Consider now the example where wireless telephone 104 utilizes the local dialing plan of the node on which it is registered. Wired telephone 107 always uses the local dialing plan node 101. The use of the local dialing plan allows a telephone to dial extension numbers rather than the full directory number. When the user dials a local extension number on node 101 using wired telephone 107, TMA 115 communicates this call to DNA 105 which places the call to the called extension connected to node 101.

When wireless telephone 104 is registered on node 102 and dials a extension number which is part of the local dialing plan of node 102, TMA 106 interrogates the TSP information received from the management system 110 and converts the dialed extension number into the full telephone number of the extension and places a call to DNA 105. DNA 105 is responsive to this call and the directory number of the telephone on node 102 to place a call to the dialed telephone on node 102. When this call is successful, DNA 105 merges the call from the wireless telephone 104 with the call placed to the telephone on node 102. For example, if wireless telephone 104, while registered on node 102, dials the extension number for wired telephone 108, a call is set up between wireless telephone 104, DNA 105 and wired telephone 108.

When wireless telephone 104 registers on node 101 via base station 113, the TSP information received from management system 110 defines that the local dialing plan to node 101 is to be utilized. Hence, when wireless telephone 104 dials a telephone connected to node 101, it can utilize the local dialing plan of node 101.

Figure 2:
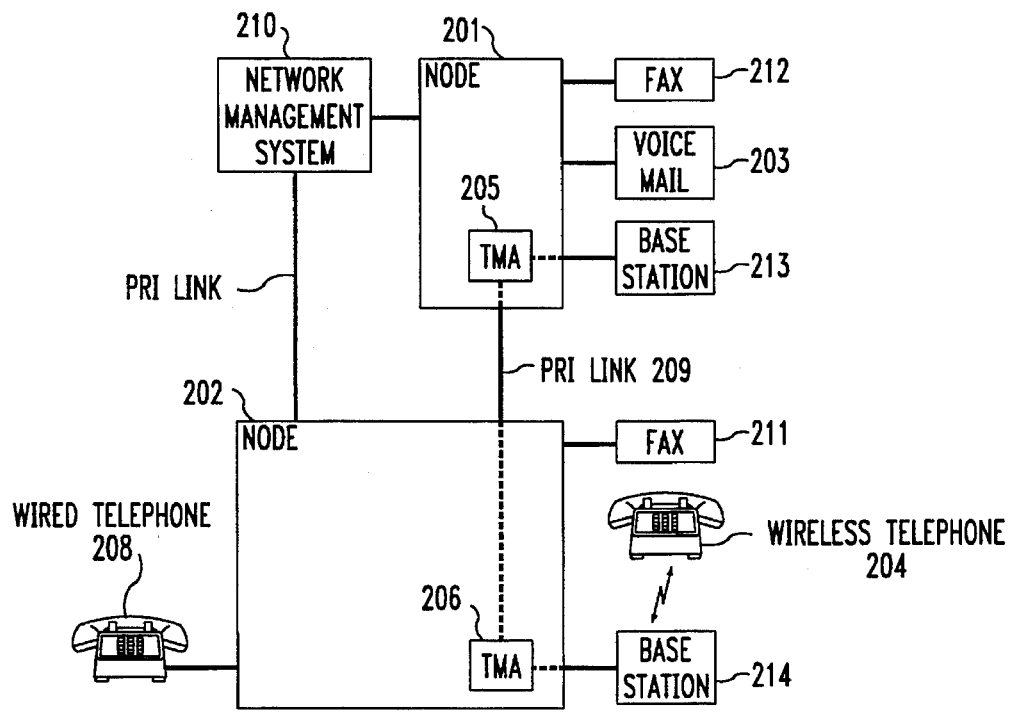
FIG. 2 illustrates, in block diagram form, another embodiment of the inventive concept.

FIG. 2 illustrates the case where wireless telephone 204 does not share the dialed number with any other telephone. However, node 201 is considered to be the home node for wireless telephone 204 and certain features should function as if wireless telephone 204 was registered on node 201 regardless on which node wireless telephone 204 is actually registered.

Consider the following three examples of how local dependent wireless features are provided to wireless telephone 204. When wireless telephone 204 registers on node 202 via base station 214, TMA 206 is created to provide the terminal management functions for wireless telephone 204. TMA 206 requests the SPID information from wireless telephone 204. The SPID information identifies the TSP stored in management system 210. TMA 206 utilizes the SPID to obtain the set of TSP information from management system 210. Management system 210 stores a different set of TSP information for each node, determines from which node the request for TSP information is received, and selects the correct set of TSP information. The received set of TSP information defines that all fax calls directed to wireless telephone 204 are to be redirected to fax 211 on node 202, that calls received which will be sent to call coverage provided by a voice mail system are to be redirected to voice mail system 203 connected to node 201, and that the local dialing plan for node 202 is to be utilized for calls placed by wireless telephone 204.

When a fax call is received by TMA 206, TMA 206 utilizes the redirect operation to transfer that call to fax 211. The redirect operation is described in greater detail in U.S. patent application, Ser. No. 07/816,363, "Redirection of Calls By a Communication Terminal", filed Dec. 30, 1991, is assigned to the same assignee as the present patent application, and is hereby incorporated by reference.

TMA 206 is responsive to a voice call which is unanswered by wireless telephone 204 to redirect this voice call to voice mail system 203 that is connected to node 201. TMA 206 also transmits to voice mail system 203 information defining the calling party and the fact that wireless telephone 204 was the called party.

When wireless telephone 204 dials the number for voice mail system 203 utilizing the local dialing plan of node 201, TMA 206 translates the dialed number using the TSP information to a telephone number recognized by node 202 for voice mail system 203 and places a call to voice mail system 203 via node 201. TMA 206 transmits to voice mail system 203 the directory number for wireless telephone 204, in the setup message. This allows the user of wireless telephone 204 to access voice mail system 203 as if wireless telephone 204 was registered on node 201 via base station 213.

When registered on node 202, wireless telephone 204 utilizes the local dialing plan of node 202 to place calls within node 202 such as to wired telephone 208. TMA 206 is responsive to the dialed local numbering plan number to place calls within node 202. The information to perform this dialing operation is received in the TSP information from management system 210.

When wireless telephone 204 registers onto node 201 via base station 213, TMA 205 is created. TMA 205 obtains the SPID information from wireless telephone 204 and using the SPID information accesses the TSP information form management system 210. The TSP information transmitted by management system 210 is different from that transmitted 16 TMA 206. Management system 210 is responsive to the node from which the TSP information is being requested to access a different set of TSP information. The new set of TSP information defines that wireless telephone 204 is to use the local dialing plan of node 201, utilize fax 212, and voice mail system 203.

Unlike a prior art system of switching nodes such as a network of Definity Generic II communication systems, a switching node of FIGS. 1 and 2 have no predefined stored information defining how this system is configured before initialization, with what telecommunication links are terminated on which nodes, what interfaces are utilized to terminate those links, the physical configuration of the switching nodes, and the type and features of the station sets. Further, there is no predefined information setting forth the two dialing plans which are utilized to identify the telecommunication terminal equipment connected to each of the switching nodes. Finally, each switching node has no predefined knowledge of what telecommunication terminals are connected to it.

Each switching node determines the above information upon the entire system being initialized or an individual switching node being initialized or the initialization of a new telephone communication terminal. In addition, an individual switching node begins to determine new paths through the system upon an individual telecommunication link becoming active after the switching node has been initialized. To obtain this information, each switching node as it becomes active must perform the following functions: (1) establish its own internal configuration, (2) identify and initialize interfaces, (3) establish its position in the switching node hierarchy, (4) obtain ownership for its portion of the primary dialing plan, and (5) learn how to route calls through the systems. In addition, NMS 110 must establish a call to each switching node in order to distribute the primary and secondary routing dialing plans among the switching nodes and to provide other management functions. Each of these functions is described in the U.S. Patent Application of B. M. Bales, et al. "Automatic Initialization of a Distributed Telecommunication System", Ser. No. 07/816360, filed on Dec. 30, 1991, now U.S. Pat. No. 5,386,466 assigned to the same assignee as the present application, and hereby incorporated by reference.

Figure 3:
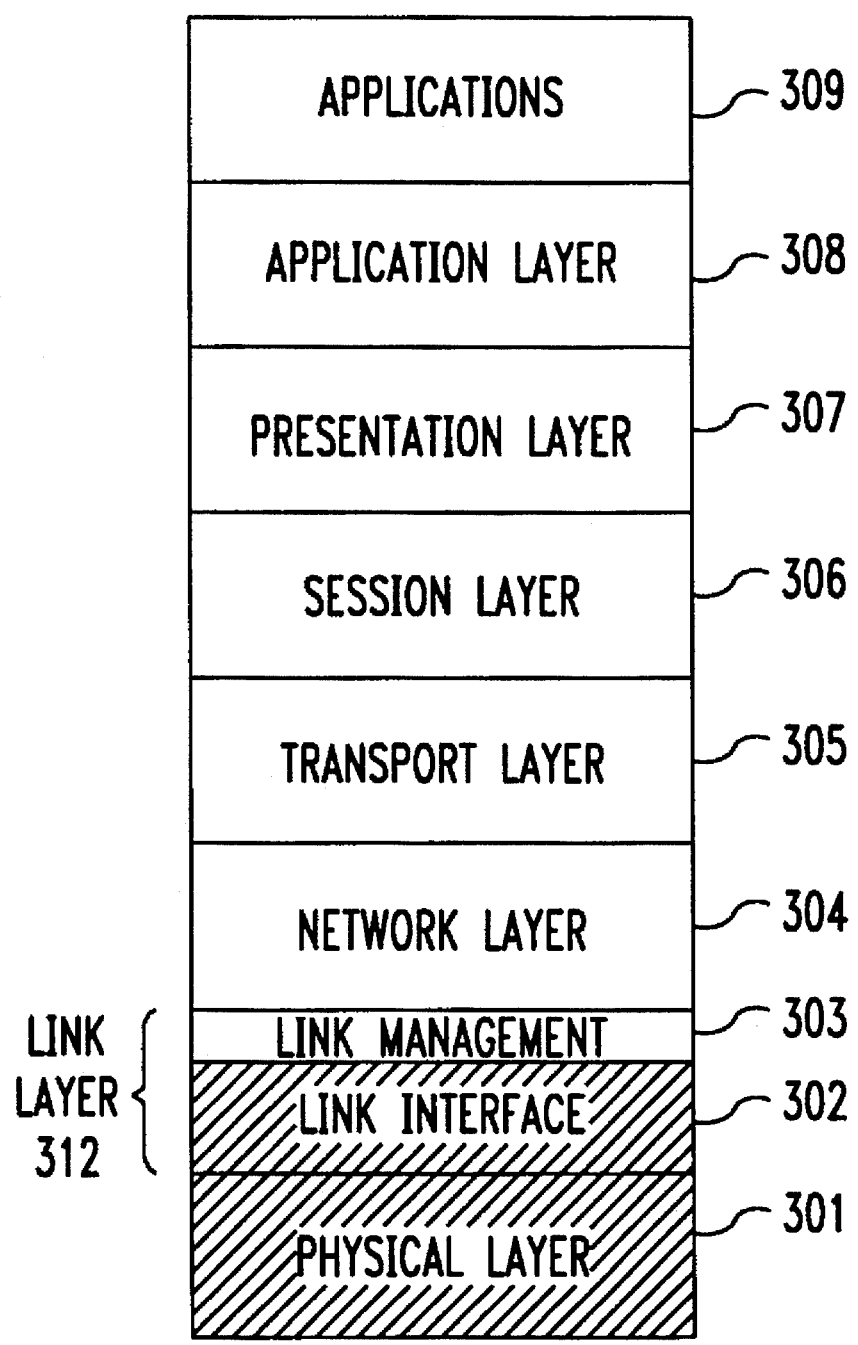
FIG. 3 illustrates the software architecture implemented in each of the switching nodes.

FIG. 3 illustrates the software architecture of the switching nodes of FIGS. 1 and 2. This architecture is based on the conventional OSI model modified to implement the ISDN protocol. In accordance with the invention as described herein, certain further modifications have been made to the standard model in order to include ISDN capabilities.

The principal function of physical layer 301 is to terminate physical links. Specifically, physical layer 301 is responsible for maintaining physical channels and for controlling physical subchannels thereon. Physical layer 301 comprises a software portion and physical interfaces. Further, the software portion of physical layer 301 is responsible for the direct control of the physical interfaces to which physical links communicating PRI and BRI information terminate. Physical layer 301 presents to link layer 312 physical subchannels and physical channels as entities controllable by link layer 312.

The primary function of link layer 312 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 312 and physical layer 301. (An example of this type of protocol is the LAPD packet protocol used in ISDN Q.921. In the ISDN standard, link layer 312 terminates the LAPD protocol.) Link layer 312 can support multiple protocols so that the upper layers are uneffected by the different protocols being utilized. Further, link layer 312 allows higher software layers to control physical layer 301 in an abstract manner.

As seen in FIG. 3, link layer 312 is divided into link interface 302 and link management 303. The reason for this division is set forth herein below. It will be helpful at this point to discuss the communication of ISDN signals over a D channel to help readers, for example, who have only a rudimentary knowledge of the communication of ISDN signals over a D channel. At link layer 312, a plurality of logical links is established on each D channel. One of these logical links communicates ISDN control signals to each endpoint, and each call control logical link is referred to herein as a logical D channel (LDC). The LDC is identified by a logical D channel number (LDCN).

Link interface 302 does the majority of the functions performed by link layer 312, including the establishment of the logical links. Link management 303 identifies the various link interfaces for higher software layers. Further, link management communicates information between the logical links and higher software layers.

Network layer 304 processes information communicated on the LDCs, and thereby terminates the ISDN Q.931protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 304 of switching node 101 negotiates with its peer layer (the corresponding network layer 304 in switching node 102) in order to obtain allocation of a B channel in PRI link 150 — a procedure later to be repeated if a second B channel is desired. This negotiation is carded out using standard ISDN Q.931 messages such as the call setup and connection messages via the LDC setup on the D channel of PRI link 150. Network layer 304 identifies all B channels of a given interface with the LDC for that interface. Network layer 304 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 304 receives information from another node concerning a call via a LDC. As information is received on the LDC, a call reference number is utilized to identify the call associated with this message. The call reference number is selected by the originating network layer during call setup in accordance with the ISDN standard.

Transport layer 305, is the key element that allows the routing of a call through a complex system having multiple nodes as illustrated in FIG. 1. Its primary function is to manage the routing of calls externally, i.e., between switching nodes. Transport layer 305 views the system of FIG. 1 in terms of nodes and is concerned with routing calls from its own node to other nodes or endpoints. (As explained in the detailed discussion of session layer 306, that layer, not transport layer 305, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing layer 3 and signaling paths (LDCs) established between switching nodes.

With respect to inter-node routing, transport layer 305 is the first layer that starts to take a global view of the overall system illustrated in FIG. 1. Transport layer 305 uses information provided by session layer 306 to select the inter-node path. The transport layer performs its task of routing between various nodes by the utilization of tables defining the available paths and the options on those paths. These tables do not define all paths but only those paths which the node has already used.

Communication between transport layers is done by network layer 304 using established LDCs. Transport layer 305 communicates information destined for its peers to network layer 304, and network layer 304 packages this information within the information elements, IEs, of standard ISDN Q.931 messages. Network layer 304 uses the LDC that has been setup to a particular node to communicate this information to its peer network layer. Similarly, when another network layer receives information of this type, the other network layer unpackages information and then directs the information to the transport layer.

The primary function of session layer 306 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 306 any time two applications require communication with each other. As noted earlier, session layer 306 deals only in terms of switching nodes and applications on those switching nodes and relies on transport layer 305 to establish paths to other switching nodes. Session layer 306 identifies the called application by an address which previously in the telecommunication art was thought of as only a telephone number but has a much broader concept in the Q.931protocol. From this address, session layer 306 determines the destination switching node. Session layer 306 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 307 of FIG. 3 invokes a complex protocol in order to groom the information being communication between applications so that the applications are totally divorced from the protocol used to communicate the information. A presentation level protocol allows an application to communicate with a peer application across a transport path.

Finally, application layer 308 manages the resources needed by the applications running at software layer 309. When an application at software layer 309 is communicating with another peer application, the application is unaware of how many other applications exist or where these other applications are located. It is the function of application layer 308 to determine and use such details, consequently allowing the applications to be written in a very abstract manner. At applications layer 309, the following applications are normally executing: the system management, dialing plan, terminal management, connection manager, directory number management, and call applications.

A brief description is given of how a standard ISDN link is initialized with respect to the software layers. During the previous discussion of link interface layer 302 and physical layer 301 of FIG. 3, it was described how these two layers function together to establish logical links on packetized ISDN D or B channels. Link management software layer 303 identifies these logical links and communicates information to or from one of the logical links with any designated higher software layer. The destination of the higher software layer occurs when the logical link is initialized. For example, on a D channel of a standard ISDN link, one specific logical link (referred to as a logical D channel, LDC) is always communicated to network software layer 304 in accordance with the ISDN specification. The LDC communicates all call control information for the B channels of the standard ISDN link and is an integral part of the ISDN specification.

Consider the initialization of a standard ISDN link. When a standard ISDN link becomes active, the physical layer identifies the physical interface number of that link to the link interface software layer. The link interface software layer uses the packet protocol on the D channel to identify what is on the other side of the interface by communicating over a pre-specified logical link of the D channel. The link interface software layer then informs the link management software layer that a new interface is active, that it has a certain number of B channels, and identifies to what the new interface is connected (if possible). The link management software layer informs the network software layer that a new interface is active and that it contains a certain number of B channels.

In response, the network software layer records the new interface's existence and sets up tables to control the B channels. If call control signaling has not previously been established with the other side over a different interface, the network software layer assigns an LDC record to the interface and requests that the link management layer establish a signaling logical link with the other side. This request is passed to the link interface layer which uses the LAP-D protocol to establish signaling. When the signaling logical link is established, the link interface layer notifies the link management layer which notifies the network software layer that call signaling is active. Finally, the network software layer informs the transport software layer that a new LDC is active and to what system entity the new LDC is connected. If the new link is connected to terminal, transport layer 305 informs application layer 308 which starts the execution of a terminal management application. The latter application obtains the TSP for the new terminal.

Figure 4:
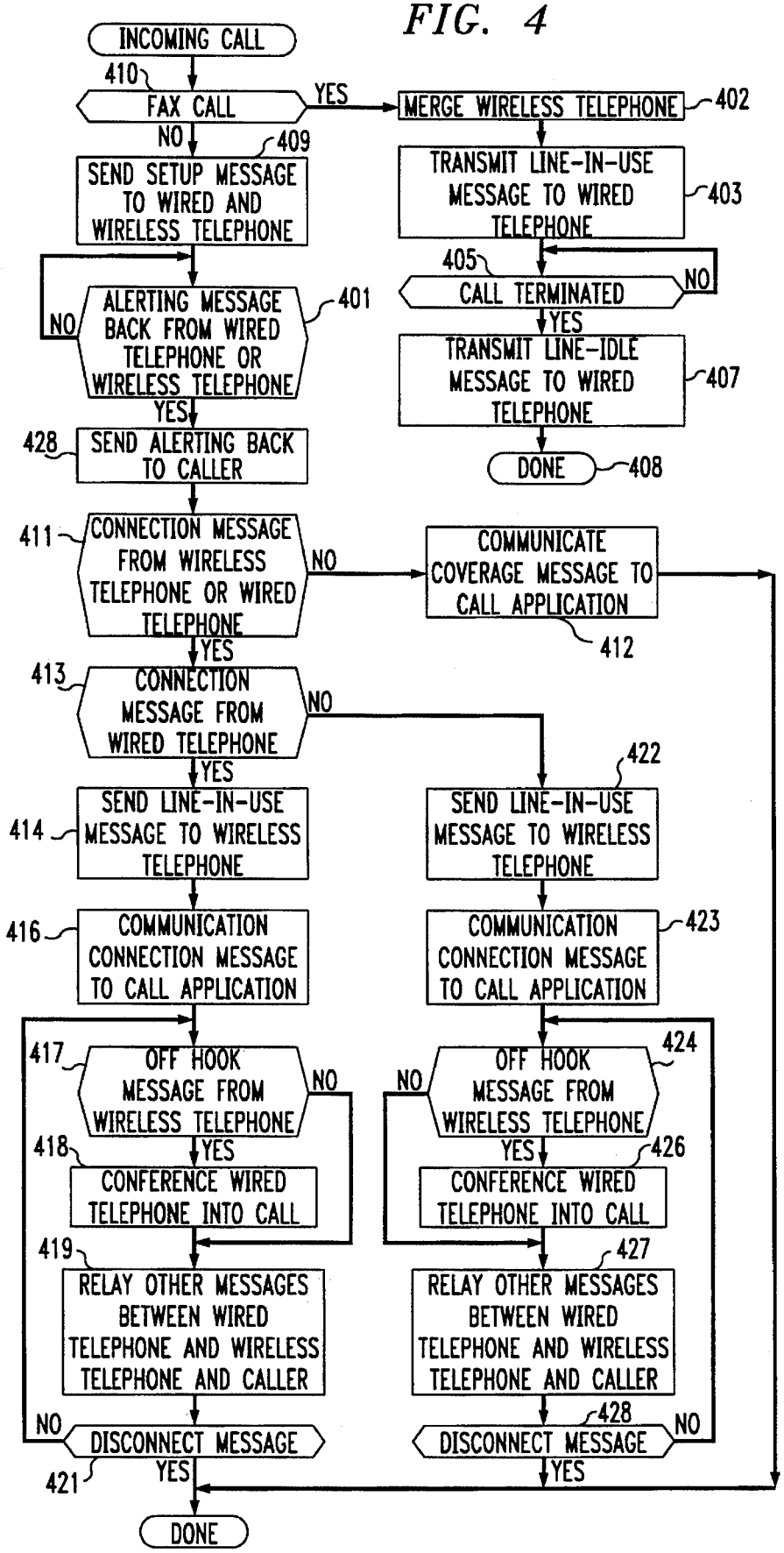
FIG. 4 illustrate, in flow chart form, the operations performed by a directory number application program for a incoming call.

FIG. 4 illustrates in flow chart form the operations performed by DNA 105 of FIG. 1. Upon receipt of a message from the lower software layers of node 101, DNA 105 first determines if the incoming call is a fax call by execution of decision block 410. If the incoming call is a fax call, control is transferred to block 402 which establishes a merged call between wireless telephone 104, the calling party, and DNA 105. Block 403 transmits a line-in-use message to wired telephone 107 to inform the wired telephone that the shared directory number is being utilized. Control is then transferred to decision block 406 which determines when the fax call has been terminated either by the calling party or the fax machine conferenced into the call by wireless telephone 104. Once the call is terminated, block 407 transmits a line-idle message to wired telephone 107.

Returning to decision block 410, if the answer is no, control is transferred to block 409 which sends a setup message to the wired and wireless telephones. Decision block 401 waits until an alerting message is received back from the wired or wireless telephone. Then, control is transferred to block 428 which sends an alerting message back to the caller.

Decision block 411 determines when either the wired or wireless telephone has answered the call and transmitted a connection message back to DNA 105. If a connection message is not received back in a predefined amount of time, decision block 411 then transfers control to block 412 which requests that call coverage be provided by the call application which resides in the application software layer with DNA 105. In response to the call coverage message, the call application will transfer the call to the voice mail system.

Returning to decision block 411, if the answer is yes, control is transferred to decision block 413. The purpose of block 413 is to determine whether wireless telephone 104 or wired telephone 107 answered the call so that the idle unit can receive a line-in-use message which results in the line-in-use indicator being actuated on the receiving unit. If a connection message is received from wired telephone 107, block 414 transmits the line-in-use message to wireless telephone 104. Next, directory number management application 105 transmits a connection message to the calling terminal.

Decision block 417 checks to see whether an off hook message has been received from wireless telephone 104 which indicates that wireless telephone 104 wants to enter into the call which is now in progress between wired telephone 107 and the calling terminal. If wireless telephone 104 does go off hook, directory number management application 105 transmits a message to the lower software layers causing wireless telephone 104 to be conferenced into the call.

The purpose of block 419 is to receive messages from wireless telephone 104 and wired telephone 107 which are transmitted to directory number management application 105 via the directory dialing plan. Similarly, messages received from the calling terminal are retransmitted to wireless telephone 104 and wired telephone 107 via the secondary dialing plan but with no changes to information concerning the calling terminal.

Decision block 421 checks to see whether a message received from wireless telephone 104 or wired telephone 107 or the calling terminal is a disconnect message. A disconnect message from the calling terminal terminates the call or a disconnect message from the last unit using secondary numbers on the call (wireless telephone 104 and wired telephone 107) terminates the call. If the call is not terminated, control is passed from decision block 421 back to decision block 417. Once the call has been terminated, the processing of an incoming call is completed.

Blocks 422 through 428 of FIG. 4 function in a similar manner to that previously described for blocks 414 through 421. The difference being that blocks 422 through 428 assume that wireless telephone 104 responded to the incoming call rather than wired telephone 107.

Figure 5:
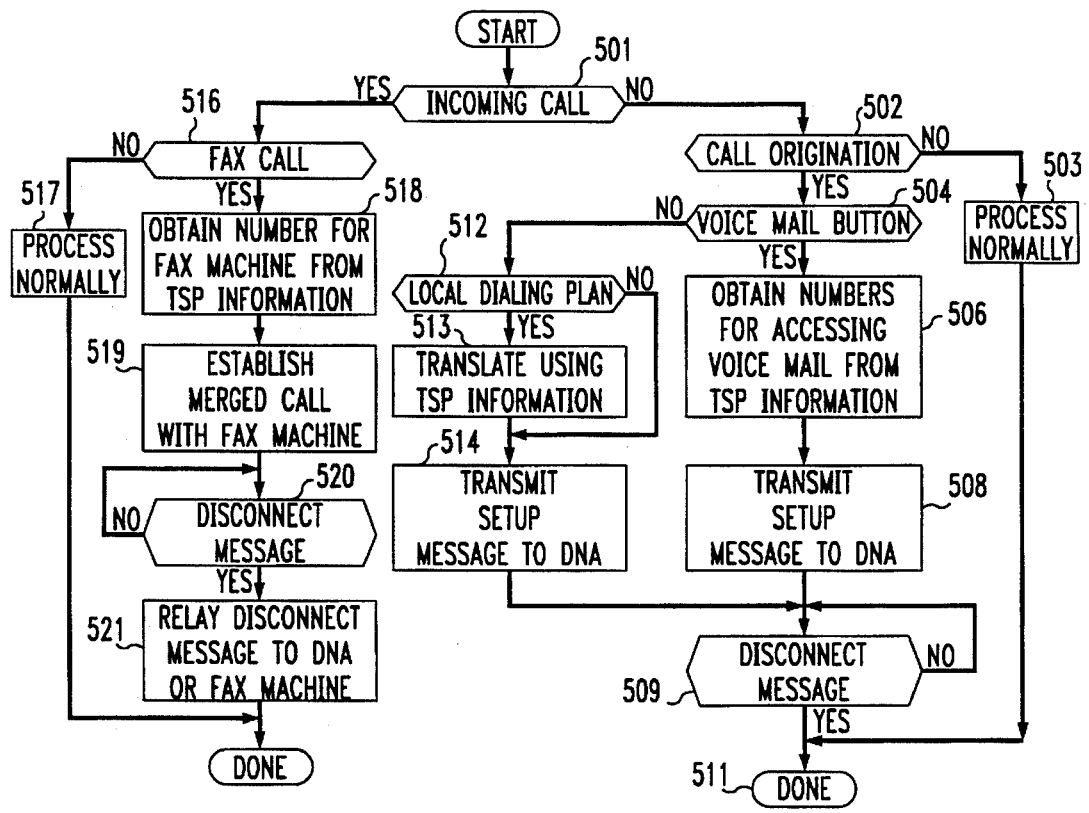
FIG. 5 illustrate, in flow chart form, the operations performed by a terminal management application program, when the wireless mobile is sharing a directory number.

FIG. 5 illustrates the operations performed by TMA 106 when wireless telephone 104 is sharing a directory number with wired telephone 107. Decision block 501 determines if a message being received is for an incoming call from DNA 105. If the answer is yes, control is transferred to decision block 516 which checks to see if the incoming call is a fax call. (A fax call is determined by examining the bearer capability information in the initial setup message.) If it is not a fax call, control is transferred to block 517 for normal processing. If it is a fax call, control is transferred to block 518. The latter block accesses the TSP information and determines the telephone number of the fax machine. Block 519 then establishes a merged call with the fax machine and the incoming call. Decision block 520 determines when the call is finished by monitoring for a disconnect message from either the fax machine or DNA 105. When the disconnect message is received, block 521 transmits this disconnect message to either DNA 105 or the fax machine depending on which entity originally transmitted the disconnect message.

Returning to decision block 501, it the answer is no, control is transferred to decision block 502 to determine whether wireless telephone 104 is doing a call origination. If it is not a call origination, block 503 receives control and processes the message in a normal manner.

Returning to decision block 502, if the answer is yes, decision block 504 determines whether or not the user has activated the voice mail button on wireless telephone 104. If the answer is yes, control is transferred to block 506 which obtains the numbers for setting up the call to the voice mail system from the TSP information. This information contains the telephone extension number of the voice mail system on node 101. Block 408 transmits a setup message to DNA 105 which sets up the call to voice mail system 105. Decision block 509 monitors for a disconnect message and upon receipt of a disconnect message transfers control to exit 511.

Returning to decision block 504, if the answer is no, control is transferred to decision block 512 which determines if the local dialing plan of the node on which wireless telephone 104 is registered is being utilized. If the local dialing plan is being utilized, block 513 translates the dialed number utilizing the TSP information to conform to the full directory number. Finally, control is transmitted to block 514 which transmits the setup message to DNA 105. The setup message includes the full directory number. DNA 105 is responsive to set up a merged call between wireless telephone 104 and the called telephone. After execution of block 514, control is transferred to block 509 whose functions have already been described.

Figure 6:
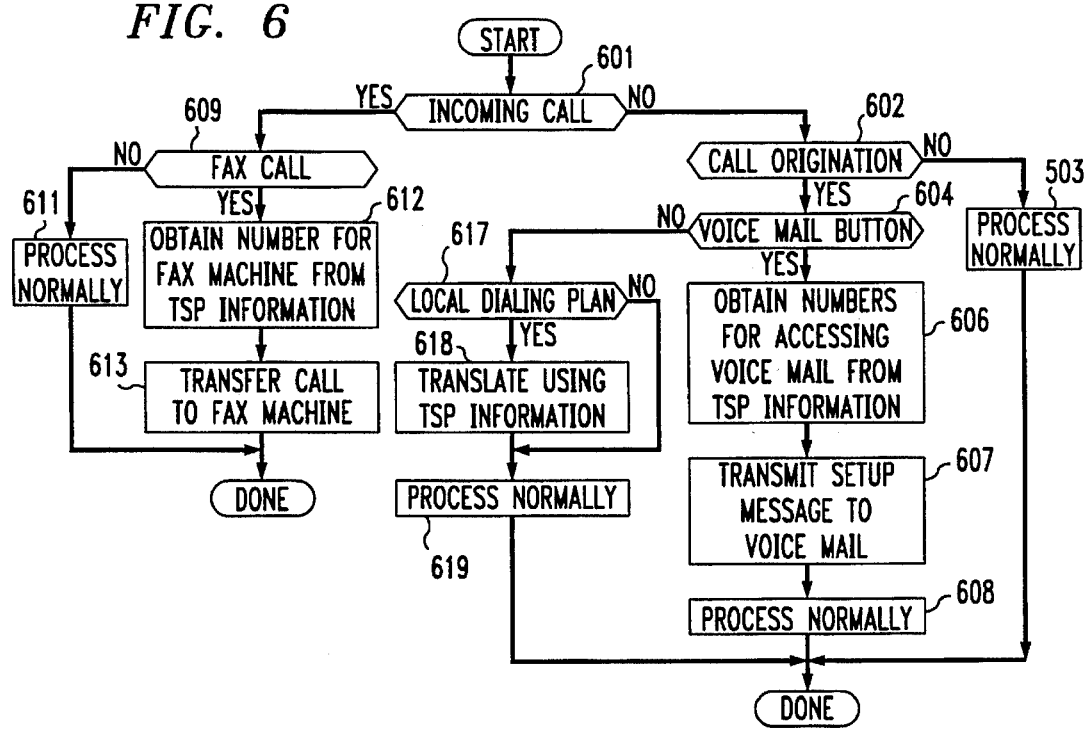
FIG. 6 illustrate, in flow chart form, the operations performed by a terminal management application program, when the wireless mobile is not sharing a directory number.

FIG. 6 illustrates the operations performed by TMA 106 of FIG. 2. In FIG. 2, wireless telephone 204 does not share a directory number with a wired telephone. Decision block 601 determines whether the message being received constitutes an incoming call from DNA 105. If it is an incoming call, control is transferred to decision block 609 which determines whether the incoming call is a fax call or not. If it is not a fax call, control is transferred to block 611 which processes the incoming call in a normal manner. If it is a fax call, block 612 obtains the number for the fax machine to which fax calls are to be transferred for wireless telephone 204. Block 613 then transfers the fax call to the designated fax machine.

Returning to decision block 601, if the answer is no, control is transferred to decision block 602. The latter block determines whether the message constitutes a call origination by the user of wireless telephone 204. If it is not a call origination, control is transferred to block 602 which processes the message in a normal manner.

If it is a call origination, decision block 602 transfers control to decision block 604 which determines whether the user has activated the voice mail button on wireless telephone 204. If the answer is yes, block 606 obtains the telephone's numbers necessary for accessing the voice mail system from the TSP information. Block 607 then transmits a setup message to the voice mail system, and control is transferred to block 608 which processes the call to the voice mail system in the normal manner.

Returning to decision block 604, if the answer is no, control is transferred to decision block 617 which determines whether the user is originating the call using the local dialing plan of the switching node to which wireless telephone 204 is presently registered. If the answer is yes, block 618 then transmits the dialed number utilizing the TSP information and transfers control to block 619. Block 619 then processes the remainder of the call in the normal manner.

Figure 7:
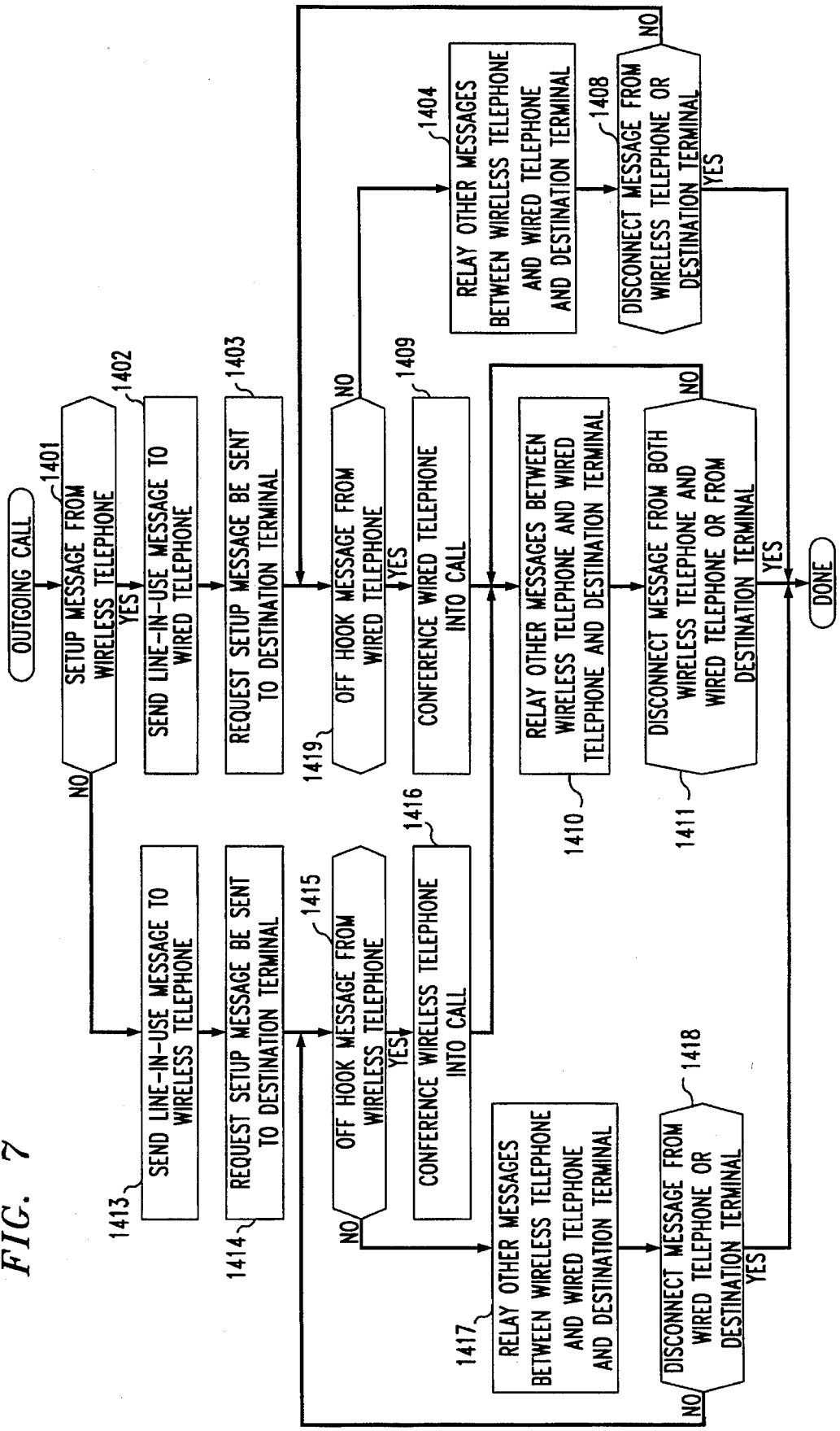
FIG. 7 illustrate, in flow chart form, the operations performed by a directory number application program for an out going call.

FIG. 7 illustrates, in flowchart form, the operations performed by DNA 105 when either wireless telephone 104 or wired telephone 107 originates a call. When either unit originates a call, the line-in-use indicator must be actuated on the other terminal. Basically, an origination of a call by either terminal results in that call being first set up to DNA 105. The latter application then sets up a second call to the called/destination terminal and merges the two calls. FIG. 14 has two main paths depending on whether the setup message was originally received from wireless telephone 104 or from wired telephone 107. The operations of FIG. 7 will be described with respect to wired telephone 107 originating the call.

Decision block 701 determines whether the setup message is from wireless telephone 104 or wired telephone 107. If the message is from wired telephone 107, block 702 is executed which transmits a line-in-use message to wireless telephone 104. This message will cause the line-in-use indicator for wireless telephone 104 to be actuated. Next, DNA 105 transmits a setup message to the called terminal which was identified by wired telephone 107.

After transmission of the setup message from DNA 105 to the called terminal, decision block 703 is checked to determine if wireless telephone 104 has gone off hook which indicates that wireless telephone 104 wants to be part of the call between wired telephone 107 and the called terminal. If the result of the execution of decision block 703 is yes, block 709 is executed which causes wireless telephone 104 to be conference into the present call. Next, 710 is executed which relays the messages received from wireless telephone 104 and wired telephone 107 to the called terminal and vice versa. Decision block 711 checks to see whether one of these messages was a disconnect message which results in no parties being present on one side of the call. If the results of decision block 711 is no, control is returned back to block 710. If the result of decision block 711 is yes, the call is terminated.

Returning to decision block 703, if wireless telephone 104 has not gone off hook, control is transferred to block 704 which performs the same operations as previously discussed for block 710. Decision block 708 checks to see whether wired telephone 107 or the called terminal has transmitted a disconnect message. If the answer is yes, the call is terminated. However, if the answer is no, control is transferred back to decision block 703.

Blocks 713 through 718 function in a similar manner to that of blocks 702 through 711 with the exception that the terminal originating the call is wireless telephone 104.

Figure 8:
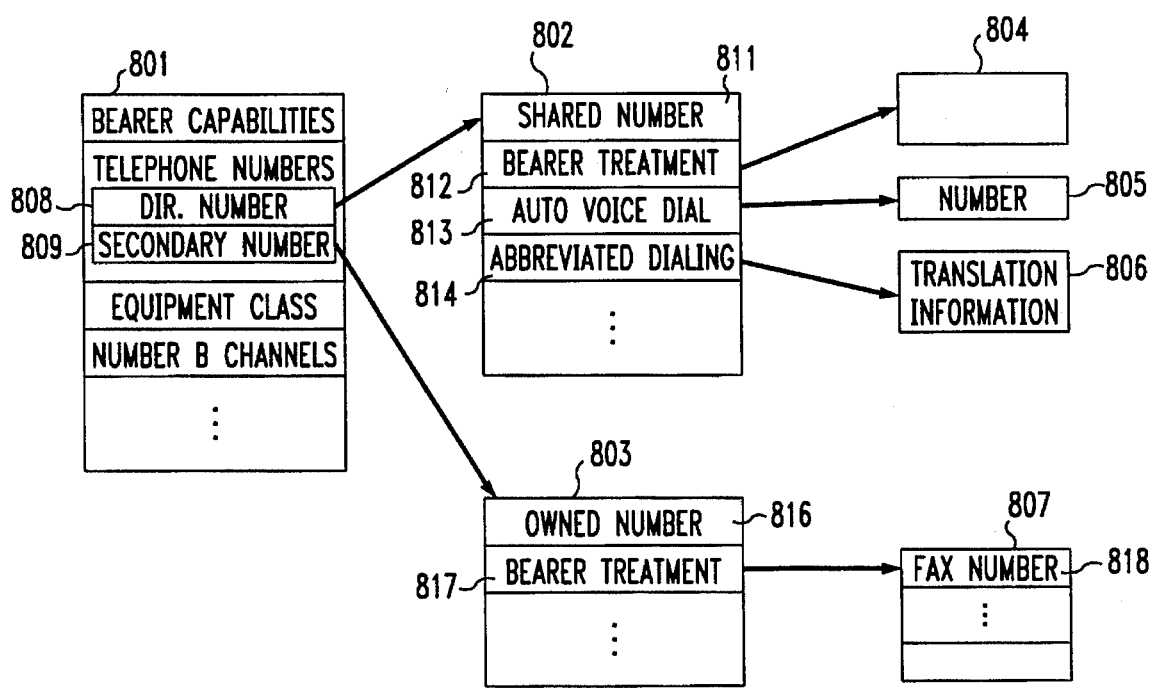
FIG. 8 illustrates a terminal service profile for use by a terminal management application program.

FIG. 8 shows the TSP information layout for TMA 106 of FIG. 1. The information is organized into three levels of information. The first level is block 801, the second level is blocks 802 and 803, and the third level is blocks 804 through 807. When the user of wireless telephone 104 places a call using the line associated with the shared directory number, TMA 106 accesses block 801 and determines a path to block 802 via entry 808. Block 802 contains information defining how calls are placed or received using the line associated with the shared directory number. Entry 811 designates that the directory number is a shared number. Entry 812 defines the type of bearer treatment that will be utilized by pointing to this information which is contained in block 804. Entry 813 points to block 805 which gives information concerning the effect that actuation of the auto dial button for the voice mail system will be given. Entry 814 is for abbreviated dialing and points to the translation information given in block 806.

When the user of wireless telephone 104 actuates the auto dial button for the voice mail system, TMA 106 uses the number found in block 805 as the number for voice mail system 103. TMA 106 then places a call through DNA 105 to voice mail system 103. In the case of TMA 206 of FIG. 2, the directory number is utilized to identify wireless telephone 204 to voice mail system 203.

When the user of wireless telephone 104 originates a call using the local dialing plan of node 102, TMA 106 accesses the translation information of block 806 via entry 814. If the translation information defines how the dialed local number may be converted, the converted number, which is the full directory number, is then utilized to place a call via DNA 105 to a wired telephone such as wired telephone 108.

When a fax call is received for the shared directory number by DNA 105, DNA 105 directs this call to TMA 106 utilizing the secondary numbering plan. TMA 106 is responsive to the call from DNA 105 and the secondary number to access block 803 via entry 809 of block 801. TMA 106 next uses entry 817 to determine what the bearer treatment should be for a fax call. Entry 817 points to entry 818 of block 807 which is the directory number of fax 111. TMA 106 then places a call to fax 111 as was previously described with respect to FIG. 5.

FIG. 8 illustrates the information necessary to perform the three examples that have been used in the present application. However, one skilled in the art could readily see that the blocks set forth in FIG. 8 could be expanded to contain additional information. For example, table 801 could contain more than one directory number and one secondary number entry.

Figure 9:
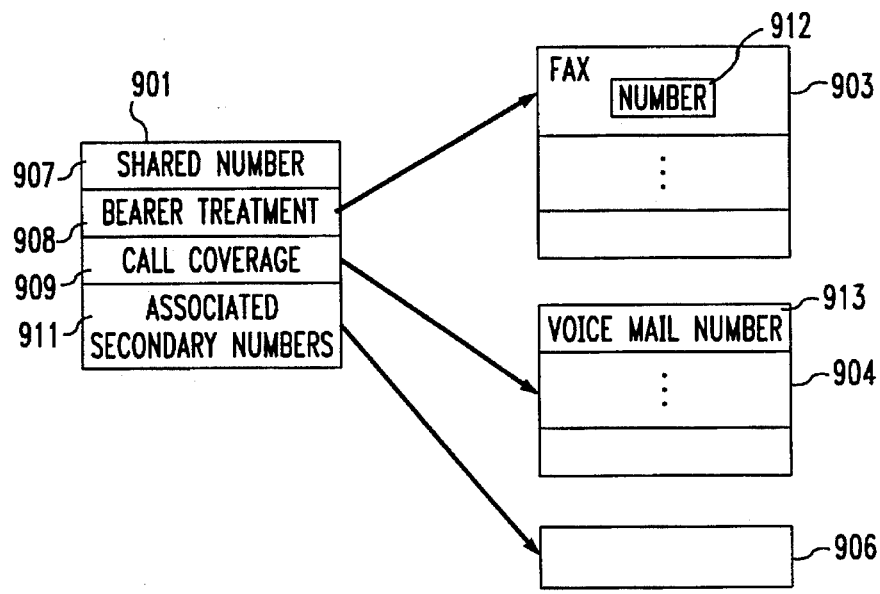
FIG. 9 illustrates a service profile for use by a directory number management application program.

FIG. 9 illustrates the organization of the service profile information received by DNA 105 from network management system 110. Since there is no physical interface equipment associated with DNA 105, an equivalent to block 801 of FIG. 8 is not shown in FIG. 9. Entry 907 defines that it is a shared directory number. Entry 908 points to block 903 which defines the bearer treatment that is to be given to incoming calls. Entry 909 points to block 904 which defines the call coverage hierarchy. Entry 911 points to block 906 which contains the secondary numbers associated with the shared directory number. The associated secondary numbers in the present application are the secondary numbers utilized by TMA 115 and TMA 106.

When a call is transferred to call coverage, as illustrated in block 412 of FIG. 4, the information contained in block 904 is utilized to determine the priority of the various call coverage services that can be utilized. The first entry in block 904 is entry 913 which defines the directory number of voice mail system 103.

When a fax call is received, table 903 is used to determine the number to which the call will be sent. This number is in entry 912. Entry 912 is always the secondary number of wireless telephone 104 in the present examples. However, entry 912 could define any fax machine available on nodes 101 and 102.

It is to be understood that the above-described embodiments are merely illustrative of principles of the invention and that other arrangements may be devised by those skilled in the art without departing from the spirit or scope of the invention.

We claim:

1. A method for providing location dependent features and location independent features for a telecommunication unit across a telecommunication switching system having a plurality of switching nodes where the telecommunication unit is connectable to any of the switching nodes, comprising the steps of:

provising the location dependent features in a first manner at first switching node in response to a first set of control information upon the telecommunication unit being connected to the first switching node;

providing the location dependent features in a second manner at second switching node in response to a second set of control information upon the telecommunication unit being connected to the second switching node; and providing location independent features in a fixed manner regardless of which switching node the telecommunication unit is connected.

2. The method of claim 1 wherein the telecommunication unit is a wireless telephone.

3. The method of claim 2 wherein the step of providing location dependent features at a first switching node comprises the steps of executing a terminal application program on the first switching node; and receiving, by the terminal application program, the first set of control information from a network management system via the first switching node whereby the terminal application program provides the location dependent features in the first manner; and step of providing the location dependent features at the second switching node comprises the steps of executing the terminal application program on the second switching node; and receiving, by the terminal application program, the second set of control information from a network management system via the second switching node whereby the terminal application program provides the location dependent features in the second manner.

4. The method of claim 3 further comprises the step of sharing a directory number, by a wired telephone and the wireless telephone, with the location independent features being provided to the wired telephone and the wireless telephone.

5. The method of claim 4 wherein the step of sharing comprises the steps of executing a directory number application program on the switching node to which the directory number is assigned.

6. The method of claim 5 wherein the step of sharing comprises the step of controlling the provisioning of the location independent features by the directory number application program.

7. The method of claim 6 further comprises steps of disconnecting the wireless telephone from the second switching node;

reconnecting the wireless telephone to a third switching node;

executing the terminal application program on the third switching node;

receiving, by the terminal application program, a third set of control information from the network management system via the third switching node; and providing the location dependent features in a third manner by the terminal application program in response to the third set of control information.

8. The method of claim 3 further comprises the step of providing the location independent features by terminal application program in response to the first control information when the wireless telephone is connected to the first switching node and in response to the second control information when the wireless telephone is connected to the second switching node.

9. The method of claim 8 further comprises the steps of disconnecting the wireless telephone from the second switching node;

reconnecting the wireless telephone to a third switching node;

executing the terminal application program on the third switching node;

receiving, by the terminal application program, a third set of control information from the network management system via the third switching node; and providing the location dependent features in a third way by the terminal application program in response to the third set of control information.

10. A method for providing location dependent features and location independent features for a wireless telephone across a telecommunication switching system having a plurality of switching nodes where the wireless telephone is connectable to any of the switching nodes and the routing of calls through the telecommunication switching system uses a directory dialing plan and a secondary dialing plan, comprising the steps of:

executing a directory number application program on a first switching node;

receiving first control information, by directory number application program, from a network mangement system, with feature control being specified by the first control information;

assigning a directory number to the directory number application program for originating and terminating calls;

connecting the wireless telephone on a second switching node, and identifying the wireless telephone to the directory number application program as having a secondary number and being connected to the second switching node, and executing a terminal application program on the second switching node;

receiving second control information, by the terminal application program, from the network management system;

receiving a first incoming call requiring one of the location independent features, by the directory number application program, and controlling the implementation of the one of the location independent features by the directory number application program with the implementation of the one of the location independent features being defined by the first control information;

receiving a second incoming call requiring one of the location dependent features, by the directory number application program, and transferring control of the implementation of the one of the location dependent features to the terminal application program by communicating the second call to the terminal application program from directory number application program using a secondary number to identify the terminal application program; and controlling the implementation of the one of location dependent features by the terminal application program in response to receipt of the second call with the implementation of the one of the location dependent features being defined by the second control information.

11. The method of claim 10 further comprises the steps of disconnecting the wireless telephone from the second switching node;

reconnecting the wireless telephone to a third switching node, identifying the wireless telephone to the directory number application program as having the secondary number and being connected to the third switching node, and executing the terminal application program on the third switching node;

receiving a third incoming call requiring the one of the location dependent features, by the directory number application program, and transferring control of the implementation of the one of the location dependent features to the terminal application program by communicating the third call to the terminal application program from directory number application program using the secondary number to identify the terminal application program; and controlling the implementation of the one of location dependent features by the terminal application program in response to receipt of the third call with the implementation of the one of the location dependent features being defined by the third control information.

12. A method for providing location dependent features and location independent features for a telecommunication unit across a telecommunication switching system having a plurality of switching nodes where the telecommunication unit is connectable to any of the switching nodes, comprising the steps of:

connecting the telecommunication unit on a first switching node and executing a terminal application program on the first switching node;

receiving a first set of control information from a network management system via the first switching node;

receiving a first call requiring one of the location independent features and implementing the one of the location independent features in a first manner as defined by the first set of control information;

receiving a second call requiring one of the location dependent features and implementing the one of the location dependent features in a second manner as defined by the first set of control information;

disconnecting the telecommunication unit from the first switching node;

reconnecting the telecommunication unit to a second switching node;

executing the terminal application program on the second switching node;

receiving, by the terminal application program, a second set of control information from the network management system via the second switching node;

receiving a third call requiring the one of the location independent features and implementing the one of the location independent features in the first manner as defined by the second set of control information; and receiving a fourth call requiring the one of the location dependent features and implementing the one of the location dependent features in a third manner as defined by the second set of control information.

13. The method of claim 12 wherein the telecommunication unit is a wireless telephone.

14. An apparatus for providing location dependent features and location independent features for a telecommunication unit across a telecommunication switching system having a plurality of switching nodes where the telecommunication unit is connectable to any of the switching nodes, comprising:

means for providing the location dependent features in a first manner at a first switching node in response to a first set of control information, upon the telecommunication unit being connected to the first switching node;

means for providing the location dependent features in a second manner at a second switching node in response to a second set of control information, upon the telecommunication unit being connected to the second switching node; and means for providing location independent features in a fixed manner regardless of which switching node the telecommunication unit is connected.

15. The apparatus of claim 14 wherein the telecommunication unit is a wireless telephone.

16. The apparatus of claim 15 wherein the means for providing location dependent features at a first switching node comprises means for executing a terminal application program on the first switching node;

means for receiving in the terminal application program the first set of control information from a network management system via the first switching node whereby the terminal application program provides the location dependent features in the first manner, means for providing the location dependent features at the second switching node comprises means for executing the terminal application program on the second switching node; and means for receiving in the terminal application program the second set of control information from a network management system via the second switching node whereby the terminal application program provides the location dependent features in the second manner.

17. The apparatus of claim 16 further comprises means for sharing a directory number, by a wired telephone and the wireless telephone, with the location independent features being provided to the wired telephone and the wireless telephone.

18. The apparatus of claim 17 wherein the means for sharing comprises means for executing a directory number application program on the switching node to which the directory number is assigned.

19. The apparatus of claim 18 wherein the means for sharing comprises means for controlling the provisioning of the location independent features in the directory number application program.

20. The apparatus of claim 19 further comprises means for disconnecting the wireless telephone from the second switching node;

means for reconnecting the wireless telephone to a third switching node;

means for executing the terminal application program on the third switching node;

means for receiving, in the terminal application program, a third set of control information from the network management system via the third switching node; and means for providing the location dependent features in a third manner in the terminal application program in response to the third set of control information.

21. The apparatus of claim 16 further comprises means for providing the location independent features in the terminal application program in response to the first control information when the wireless telephone is connected to the first switching node and in response to the second control information when the wireless telephone is connected to the second switching node.

22. The apparatus of claim 21 further comprises means for disconnecting the wireless telephone from the second switching node;

means for reconnecting the wireless telephone to a third switching node;

means for executing the terminal application program on the third switching node;

means for receiving in the terminal application program a third set of control information from the network management system via the third switching node; and means for providing the location dependent features in a third manner in the terminal application program in response to the third set of control information.

23. An apparatus for providing location dependent features and location independent features for a telecommunication unit across a telecommunication switching system having a plurality of switching nodes where the telecommunication unit is connectable to any of the switching nodes and the routing of calls through the telecommunication switching system uses a directory dialing plan and a secondary dialing plan, comprising:

means for executing a directory number application program on a first switching node;

means for receiving first control information in the directory number application program from a network mangement system with feature control being specified by the first control information;

means for assigning a directory number to the directory number application program for originating and terminating calls;

means for connecting the telecommunication unit on a second switching node, and for identifying the telecommunication unit to the directory number application program as having a secondary number, and being connected to the second switching node, and for executing a terminal application program on the second switching node;

means for receiving second control information, in the terminal application program, from the network management system;

means for receiving a first incoming call requiring one of the location independent features, in the directory number application program, and for controlling the implementation of the one of the location independent features in the directory number application program with the implementation of the one of the location independent features being defined by the first control information;

means for receiving a second incoming call requiring one of the location dependent features, in the directory number application program, and for transferring control of the implementation of the one of the location dependent features to the terminal application program by communicating the second call to the terminal application program from directory number application program using a secondary number to identify the terminal application program; and means for controlling the implementation of the one of location dependent features in the terminal application program in response to receipt of the second call with the implementation of the one of the location dependent features being defined by the second control information.

24. The apparatus of claim 23 wherein the telecommunication unit is a wireless telephone.

25. The apparatus of claim 24 further comprises means for disconnecting the wireless telephone from the second switching node;

means for reconnecting the wireless telephone to a third switching node, for identifying the wireless telephone to the directory number application program as having the secondary number and being connected to the third switching node, and for executing the terminal application program on the third switching node;

means for receiving a third incoming call requiring the one of the location dependent features, in the directory number application program, and for transferring control of the implementation of the one of the location dependent features to the terminal application program by communicating the third call to the terminal application program from directory number application program using the secondary number to identify the terminal application program; and means for controlling the implementation of the one of location dependent features in the terminal application program in response to receipt of the third call with the implementation of the one of the location dependent features being defined by the third control information.

26. An apparatus for providing location dependent features and location independent features for a telecommunication unit across a telecommunication switching system having a plurality of switching nodes where the telecommunication unit is connectable to any of the switching nodes, comprising:

means for connecting the telecommunication unit on a first switching node and for executing a terminal application program on the first switching node;

means for receiving a first set of control information from a network management system via the first switching node;

means for receiving a first call requiring one of the location independent features and for implementing the one of the location independent features in a first manner as defined by the first set of control information;

means for receiving a second call requiring one of the location dependent features and for implementing the one of the location dependent features in a second manner as defined by the first set of control information;

means for disconnecting the telecommunication unit from the first switching node;

means for reconnecting the telecommunication unit to a second switching node;

means for executing the terminal application program on the second switching node;

means for receiving in the terminal application program a second set of control information from the network management system via the second switching node;

means for receiving a third call requiring the one of the location independent features and for implementing the one of the location independent features in the first manner as defined by the second set of control information; and means for receiving a fourth call requiring the one of the location dependent features and for implementing the one of the location dependent features in a third manner as defined by the second set of control information.

27. The apparatus of claim 26 wherein the telecommunication unit is a wireless telephone.

* * * * *